UNITED STATES PATENT OFFICE.

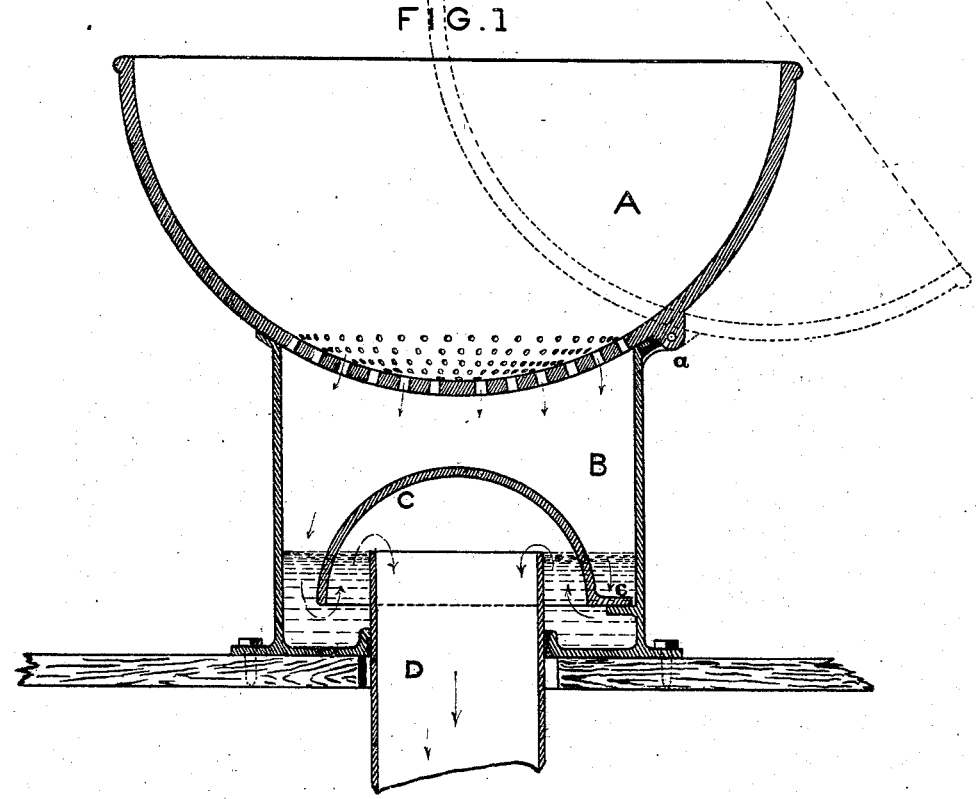

JOHN G. ILS, OF SAN FRANCISCO, CALIFORNIA.

IMPROVEMENT IN SLOP-HOPPERS.

Specification forming part of Letters Patent No. 117,635, dated August 1, 1871.

*To all whom it may concern:*

Be it known that I, JOHN G. ILS, of the city and county of San Francisco and State of California, have made an Improvement in Slop-Hoppers, of which the following is a specification:

The general character of a convenient slop-hopper consists in making the trap-chamber just large enough for the trap and the strainer large enough for the reception of the slops and rubbish, and placing the strainer upon instead of within the trap-chamber, and securing it there by a hinge.

Figure 1 is a central section view of a large hopper taken vertically through the hinge.

The accompanying drawing shows a hopper constructed with my invention forming a part thereof.

The hopper consists of two main parts, the trap-chamber B fastened to the floor or other foundation, and the strainer A resting upon it and movable. The trap-chamber is made as small as the proper operation of the trap will allow. The trap, consisting of the pipe D and cap C, is made in the ordinary manner. I prefer the sloping top for the cap, as matter is less liable to lodge upon it than on a flat one. The cap may be supported by having arms $c$ resting on projections on the interior of the chamber, or on the pipe, or in any other proper manner. The strainer A is of such size as the size of the vessels to be emptied into it and the quantity of slops and rubbish may demand. When made so large as not to be conveniently removed to be emptied of rubbish the strainer may be hinged to the trap-chamber by a permanent hinge. By this means the strainer will be kept in place and allow of an easy discharge into a pail or tub; but when the hopper is small the pin of the hinge of the strainer may be so constructed as to be readily removed, or the hinge so constructed as to allow of the detaching of the strainer. The hinge should not be in front, or the weight of vessels resting upon the edge of the strainer above it will be liable to tip the strainer. The small strainers may have a bail and a lug or handle, by which they may be carried and tipped without soiling the hands.

What I claim is—

The combination of the hinged strainer A, trap-chamber B, and pipe D, as herein recited, as and for the purpose set forth.

JOHN G. ILS.

Witnesses:
ALFRED RIX,
J. F. COWDERY.